United States Patent [19]

Shih et al.

[11] Patent Number: 5,015,708

[45] Date of Patent: May 14, 1991

[54] PRECIPITATION POLYMERIZATION OF TERPOLYMERS OF A VINYL LACTAM, A POLYMERIZABLE CARBOXYLIC ACID AND A HYDROPHOBIC MONOMER IN AN ALIPHATIC HYDROCARBON SOLVENT

[75] Inventors: Jenn S. Shih, Paramus; Terry E. Smith, Morristown; Robert B. Login, Oakland, all of N.J.

[73] Assignee: GAF Chemicals Corporation, Wayne, N.J.

[21] Appl. No.: 373,012

[22] Filed: Jun. 26, 1989

[51] Int. Cl.$^5$ .............................................. C08F 26/08
[52] U.S. Cl. ................................. 526/264; 526/317.1; 526/318
[58] Field of Search ...................... 526/264, 317.1, 318

[56] References Cited

U.S. PATENT DOCUMENTS

| | | | |
|---|---|---|---|
| 3,565,871 | 2/1971 | Bestian et al. | 526/264 |
| 4,248,855 | 2/1981 | Blank et al. | 424/497 |
| 4,482,534 | 11/1984 | Blank | 424/449 |
| 4,595,737 | 6/1986 | Straub et al. | 526/264 |

FOREIGN PATENT DOCUMENTS 1126649  9/1968  United Kingdom ................ 526/264

*Primary Examiner*—Joseph L. Schofer
*Assistant Examiner*—Alex H. Walker
*Attorney, Agent, or Firm*—Walter Katz; Marilyn J. Maue; Joshua J. Ward

[57] ABSTRACT

What is described herein is a precipitation polymerization process and terpolymer products produced thereby. Polymerization is carried out in a reaction mixture of a vinyl lactam, e.g. vinyl pyrrolidone or vinyl caprolactam, a polymerizable carboxylic acid, e.g. acrylic acid or methacrylic acid, and a hydrophobic monomer, e.g. lauryl methacrylate, in a predetermined compositional range, in the presence of a polymerization initiator, and in an aliphatic hydrocarbon solvent, particularly a $C_3$–$C_{10}$ saturated hydrocarbon, which is branched or unbranched, cyclic or acylic, and, preferably, is heptane or cyclohexane. The terpolymers are obtained in high yield, as a white powder, which can be filtered and dried easily.

15 Claims, No Drawings

PRECIPITATION POLYMERIZATION OF TERPOLYMERS OF A VINYL LACTAM, A POLYMERIZABLE CARBOXYLIC ACID AND A HYDROPHOBIC MONOMER IN AN ALIPHATIC HYDROCARBON SOLVENT

BACKGROUND OF THE INVENTION

1. Field of the Invention

This invention relates to terpolymers of a vinyl lactam, a polymerizable carboxylic acid and a hydrophobic monomer, and, more particularly, to precipitation polymerization of such terpolymers within a defined compositional range, prepared in high yield, as a white powder, which can be filtered and dried easily.

2. Description of the Prior Art

Terpolymers of vinyl lactams, e.g. vinyl pyrrolidone or vinyl caprolactam, polymerizable carboxylic acids, e.g. acrylic acid or methacrylic acid, and hydrophobic monomers, e.g. alkyl vinyl ethers, have found application in the photographic industry, as coatings, as biological membranes, in drug release systems, as preservatives, in oil recovery processes, in immunochemicals, and in cosmetic materials.

For example, Straub, F. et al. in U.S. Pat. No. 4,595,737 prepared water soluble terpolymers of a vinyl lactam, acrylic acid and 50-80% of a $C_1$-$C_4$ alkyl vinyl ether by solution polymerization in alcohol or a cyclic ether.

Blank, I. in U.S. Pat. No. 4,482,534, disclosed a solution polymerization process in cyclohexane for preparing terpolymers comprising 62.5% vinyl pyrrolidone, 5% acrylic acid and 32.5% lauryl methacrylate. The product was a viscous mass which was very difficult to filter; it was isolated by casting a film of the terpolymer and evaporating the solvent.

Blank, I. and Fertig, J., in U.S. Pat. No. 4,248,855, described a series of terpolymers of vinyl pyrrolidone, acrylic acid and methyl acrylate, prepared by solution and emulsion polymerization.

Other references of interest in this field include U.S. Pat. Nos. 3,044,873; 3,862,915; 4,283,384 and 4,737,410.

The terpolymer products made by these solution and emulsion polymerization methods, however, were not amenable to ready recovery of the polymer in high yield and in the form of a powder.

Precipitation polymerization is a known method for preparing polymers as a powder which can be filtered and dried easily; it is available when the monomers are adequately soluble in the reaction solvent and the polymer is insoluble in the solvent. A commercially successful precipitation polymerization process, however, must provide a precipitate of the polymer as a powder, in a non-toxic solvent, in high yield, which is easy to filter, and within a desired polymer compositional range.

Accordingly, it is an object of this invention to provide a precipitation polymerization process for making terpolymers comprising a vinyl lactam monomer, a polymerizable carboxylic acid monomer and a hydrophobic monomer, which precipitation polymerization process provides the terpolymer as a powder which is easy to filter, in high yield, in a non-toxic solvent, and within predetermined compositional ranges of monomer constituents.

SUMMARY OF THE INVENTION

What is described herein is a precipitation polymerization process and terpolymer products produced thereby. The polymerization is carried out in a reaction mixture of predetermined composition of a vinyl lactam, e.g. vinyl pyrrolidone or vinyl caprolactam, a polymerizable carboxylic acid, e.g. acrylic acid or methacrylic acid, and a hydrophobic monomer, e.g. lauryl methacrylate, in the presence of a polymerization initiator, e.g. a free radical initiator, in an aliphatic hydrocarbon solvent, preferably, a $C_3$-$C_{10}$ saturated, branched or unbranched, cyclic or acyclic, and, particularly, heptane or cyclohexane.

The precipitation polymerization process herein provides terpolymers having a compositional range of 20-90% by wt. vinyl lactam, 1-55% by wt. polymerizable carboxylic acid, and 1-25% by wt. hydrophobic monomer, as a white powder, which powder precipitates readily from the aliphatic hydrocarbon solvent in high yield and is easily isolated.

In the preferred embodiments of the invention, the terpolymer comprises about 40-70% vinyl lactam, 15-40% polymerizable carboxylic acid, and 5-20% hydrophobic monomer.

DETAILED DESCRIPTION OF THE INVENTION

In accordance with the invention, terpolymers of a vinyl lactam, a polymerizable carboxylic acid and a hydrophobic monomer are made by a precipitation polymerization process in an aliphatic hydrocarbon solvent in the presence of a polymerization initiator.

Suitable vinyl lactams for use herein include vinyl pyrrolidone, vinyl caprolactam and alkylated vinyl derivatives thereof.

Suitable polymerizable carboxylic acids include acrylic acid, methacrylic acid, itaconic acid and crotonic acid.

Suitable hydrophobic monomers include α-olefins, alkyl vinyl ethers, alkyl esters of polymerizable carboxylic acids, polymerizable N-alkyl and N,N-dialkyl acryl amides, vinyl esters of carboxylic acids, N-alkyl diallyl amines, and salts thereof, and, preferably where the alkyl group has at least 6 carbon atoms; polymerizable silicon alkyl compounds; and polymerizable fluorinated alkyl monomers; and mixtures of the above.

Representative examples of suitable hydrophobic monomers include: α-olefins, such as hexadecene, octadecene and p-propyl styrene; alkyl vinyl ethers, such as octadecyl vinyl ether and hexadecyl vinyl ether; alkyl esters of polymerizable carboxylic acids, such as 2-ethylhexyl acrylate and methacrylate, octyl acrylate and methacrylate, lauryl acrylate and methacrylate, and stearyl acrylate and methacrylate; polymerizable N-alkyl and N,N-dialkyl acrylamides, such as N-dodecyl methacrylamide, N-octadecyl methacrylamide and N,N-dihexyl methacrylamide; vinyl esters of carboxylic acids, such as vinyl octanoate, vinyl hexadecanoate and vinyl acetate; and N-alkyl diallyl amines, and salts thereof, such as octadecyl diallyl amine, and salts thereof; preferably where the alkyl group in the above list of compounds has at least 6 carbon atoms; polymerizable silicon alkyl monomers, such as 3-trimethoxysilyl propyl methacrylate, 3-methacryloxypropyl tris(trimethylsiloxy) silane, trimethylsilyl methyl methacrylate, and polydimethylsiloxane monomethylacryloxypropyl terminated; and polymerizable fluoroalkyl acrylates, such as perfluorooctyl methacrylate.

The silicon alkyl monomers illustrated above have the formulas:

$$H_2C=C(CH_3)-C(=O)-OCH_2CH_2CH_2Si(OCH_3)_3$$

3-trimethoxysilyl propyl methacrylate $$H_2C=C(CH_3)-C(=O)-OCH_2CH_2CH_2Si(OSiMe_3)_3$$

3-methacryloxypropyl tris(trimethylsiloxy) silane $$H_2C=C(CH_3)-C(=O)-O-CH_2-Si(CH_3)_3$$

trimethylsilyl methyl methacrylate $$H_2C=C(CH_3)-C(=O)-O-CH_2CH_2CH_2-[Si(CH_3)_2-O]_n-Si(CH_3)_3$$

polydimethylsiloxane, monomethacryloxypropyl terminated

The terpolymers made by the precipitation polymerization process of the invention have a compositional range of 20–90% by wt. vinyl lactam, 1–55% by wt. polymerizable carboxylic acid, and 1–25% by wt. of hydrophobic monomer. Preferably, the terpolymers comprise about 40–70% by wt. vinyl lactam, 15–40% by wt. polymerizable carboxylic acid, and 5–20% by wt. hydrophobic monomer.

The precipitation polymerization process of the invention can provide the terpolymer in a yield of 80% or more, preferably 90–98%, as a powder, which powder can be filtered and recovered easily.

The reaction solvent in the precipitation polymerization process of the invention suitably is a $C_3$–$C_{10}$ saturated hydrocarbon which is branched or unbranched, cyclic or acyclic. Preferably the solvent is a $C_5$–$C_8$ aliphatic hydrocarbon or mixtures thereof.

A preferred aliphatic hydrocarbon solvent over other known precipitation polymerization solvents is selected from heptane and cyclohexane. Heptane, the most preferred solvent, provides high yields of a precipitate of the desired terpolymer composition as a fine white powder which is easy to filter and dry.

The amount of solvent used in the process of the invention should be sufficient to dissolve an appreciable amount of the reactants and to maintain the terpolymer precipitate in a stirrable state at the end of the polymerization. Generally, up to about 40% solids, preferably 15–20% solids, is maintained in the reaction mixture.

The precipitation polymerization process of the invention is carried out in the presence of a polymerization initiator, preferably a free radical initiator, and most suitably, a peroxy ester, e.g. t-butylperoxy pivalate, although other free radical initiators such as acylperoxides, alkyl peroxides and azonitriles, known in the art, may be used as well.

The amount of such initiator may vary widely; generally about 0.2–5.0% is used, based on the weight of total monomers charged.

The reaction temperature may vary widely; generally the reactants are maintained at about 50°–150° C., preferably 60°–70° C., during the polymerization. Pressure usually is kept at atmospheric pressure, although higher and lower pressures may be used as well.

The reaction mixture should be stirred vigorously under an inert atmosphere, e.g. nitrogen, during the polymerization. A stirring rate of about 400–600 rpm in a 1-liter lab reactor is quite adequate to effect the desired polymerization and to keep the precipitate in a stirrable state during the polymerization.

The precipitation polymerization process of the invention may be carried out by first precharging a suitable reactor with a predetermined amount of a vinyl lactam in the aliphatic hydrocarbon solvent, and heating the mixture to the desired reaction temperature while stirring vigorously under an inert gas atmosphere. The initiator is then charged into the reactor. Then selected amounts of the polymerizable carboxylic acid and the hydrophobic monomer are admitted into the reactor over a period of time, generally about an hour or more. The reaction mixture then is held for an additional period of time for polymerization to occur. Finally, the mixture is cooled to room temperature. Filtering, washing with solvent, and drying provide the terpolymer in yields approaching quantitative, and, substantially, in a composition predetermined by the weight ratio of monomers introduced into the reactor.

Alternatively, the aliphatic hydrocarbon solvent can be precharged into the reactor, purged with nitrogen, heated to the reaction temperature, the initiator added, and then separate streams of the vinyl lactam monomer, the acrylic acid monomer and the hydrophobic monomer can be introduced over a period of time into the precharged reactor. Other process variations will be apparent to those skilled in the art.

The invention will now be described with reference to the following examples.

EXAMPLES 1–6 AND COMPARATIVE EXAMPLES A AND B

Precipitation Polymerization of Terpolymers of Vinyl Pyrrolidone, Acrylic Acid and Lauryl Methyacrylate in Heptane Solvent A 1-liter, 5-necked reaction kettle was equipped with a condenser, a thermometer, a nitrogen purge tube, two dropping funnels, and a mechanical stirrer. The reactor was precharged with vinyl pyrrolidone (VP) in 500 g. of heptane. The mixture then was heated to 65° C. in nitrogen gas and held for 30 minutes. t-Butyl peroxypivalate (260 microliter) then was charged and acrylic acid (AA) and lauryl methacrylate (LM) were added over 1 hour. Additional t-butyl peroxypivalate (140 microliter) was charged after 2 hours. The reaction mixture then was held at 65° C. for another 2 hours. The mixture was filtered, washed with heptane twice and dried in an oven overnight at 100° C. The white powder obtained then was dried in a vacuum oven at 100° C. overnight. The results are shown in Table 1 below.

TABLE 1

| Ex. No. | % by Wt. in the Charge | | | Terpolymer Yield (%) |
|---|---|---|---|---|
| | VP | AA | LM | |
| Invention Examples | | | | |
| 1 | 68 | 23 | 9 | 95 |
| 2 | 62.5 | 21 | 16.5 | 96 |
| 3 | 42 | 42 | 16 | 92 |
| 4 | 86.4 | 4.6 | 9 | 93 |
| 5 | 79 | 4.2 | 16.8 | 80 |
| 6 | 73 | 3.8 | 23 | 85 |
| COMPARATIVE EXAMPLES | | | | |
| A | 20 | 20 | 60 | 40 |

TABLE 1-continued

| Ex. No. | % by Wt. in the Charge | | | Terpolymer Yield (%) |
| --- | --- | --- | --- | --- |
|  | VP | AA | LM |  |
| B | 62.5 | 5 | 32.5 | 67 |

EXAMPLES 7-11

Precipitation Polymerization of Terpolymers of Vinyl Pyrrolidone, Acrylic Acid and stearyl Methacrylate in Heptane Solvent The procedure of the example above was followed except that the VP was added over one hour to the precharged heptane and stearyl methacrylate (SM) was used in place of lauryl methacrylate. The results are shown in Table 2 below.

TABLE 2

| Ex. No. | % by Wt. in the Charge | | | Terpolymer Yield (%) |
| --- | --- | --- | --- | --- |
|  | VP | AA | SM |  |
| 7 | 62.5 | 20.8 | 16.7 | 95 |
| 8 | 68 | 23 | 9 | 94 |
| 9 | 58 | 19 | 23 | 96 |
| 10 | 42 | 42 | 16 | 86 |
| 11 | 75 | 8.3 | 16.7 | 80 |

Examples 1-11 and the comparative examples A and B above demonstrate that successful precipitation polymerization of terpolymers of vinyl pyrrolidone, acrylic acid and lauryl methacrylate or stearyl methacrylate is dependent upon the compositional range of the monomer reactants. In particular, greater than about 30% of the hydrophobic monomer precludes an effective precipitation polymerization process, the yield of terpolymer dropping to unacceptable levels.

EXAMPLES 12-15

Preparation of Terpolymers of Vinyl Pyrrolidone, Acrylic Acid and Hydrophobic Silicon Alkyl Monomers A 1-liter reaction kettle was equipped with condenser, a thermometer, a nitrogen purge tube, two dropping funnels, and a mechanical stirrer. The reactor was precharged with vinyl pyrrolidone and 500 g. of heptane. The mixture then was heated to 65° C. in nitrogen gas and held there for 30 min. t-Butyl peroxypivalate (260 microliter) was charged and acrylic acid and trimethyloxysilylpropyl methacrylate (TMSPM) or polydimethylsiloxane, monomethacryloxypropyl terminated (DMMBMA) were added over an hour. t-Butyl peroxypivalate (210 microliter) then was charged after 1 hour and an additional 140 microliter after 2 hours. The reaction was held at 65° C. for another 2 hours. The mixture was filtered, washed with heptane twice and dried in an oven overnight at 100° C. The white powder was dried in vacuum oven at 100° C. overnight. The results are shown in Table 3 below.

TABLE 3

| Ex. No. | % by Wt. in the Charge | | | | Yield (%) |
| --- | --- | --- | --- | --- | --- |
|  | VP | AA | TMSPM | DMMBMA |  |
| 12 | 68 | 23 | 9 |  | 95 |
| 13 | 68 | 23 |  | 9 | 94 |
| 14 | 62.5 | 21 |  | 16.5 | 93 |
| 15 | 62.5 | 21 | 16.5 |  | 92 |

EXAMPLE 16

Preparation of Terpolymer of Vinyl Pyrrolidone, Acrylic Acid and Dodecyl Vinyl Ether A 1-liter reaction kettle was equipped with a condenser, a thermometer, a nitrogen purge tube, two dropping funnels and a mechanical stirrer. 500 g. of heptane was charged. The solution was heated to 65° C. and held at that temperature for 30 minutes with nitrogen purge. 260 microliter of t-butyl peroxypivalate was added and vinyl pyrrolidone (75 g.), dodecyl vinyl ether (20 g.) and acrylic acid (25 g.) were charged simultaneously over 1 hour. The mixture was heated to 85° C. over a half-hour and held at 85° C. for another half-hour. Four additions of t-butylperoxy pivalate (100 microliter each) were made hourly and the mixture was held at 85° C. for five hours. The mixture was cooled, filtered and the precipitate was dried at 100° C. for 16 hours and in a vacuum oven at 90° C. for 16 hours. Yield: 86%.

EXAMPLE 17

Preparation of Terpolymer of Vinyl Pyrrolidone, Acrylic Acid and Perfluorooctyl Methacrylate The procedure of Example 16 was followed except that VP, AA and perfluorooctyl methacrylate, 20 g., in 16 g. of acetone, was fed separately into the reactor precharged with heptane. Yield: 87%.

EXAMPLE 18

Preparation of Terpolymer of Vinyl Pyrrolidone, Acrylic Acid and Vinyl Acetate

The procedure of Example 16 was followed using 20 g. of vinyl acetate in place of dodecyl vinyl ether. Yield: 90%.

EXAMPLE 19

Preparation of Terpolymer of Vinyl Pyrrolidone, Acrylic Acid and Hexadecene

A 1-liter reaction kettle was equipped with a condenser, a thermometer, a nitrogen purge tube, two dropping funnels and a mechanical stirrer. 500 g. of heptane and 20 g. of 1-hexadecene were charged. The solution was heated to 65° C. and held at that temperature for 30 minutes while purging with nitrogen. 260 microliter of t-butyl peroxypivalate was added and vinyl pyrrolidone (75 g.) and acrylic acid (25 g.) were charged simultaneously over 1 hour. The mixture was heated to 85° C. over a half-hour and held at 85° C. for another half-hour. Four portions of t-butylperoxy pivalate (100 microliter each) were added hourly and the mixture was held at 85° C. for five hours. The mixture was cooled, filtered and the precipitate was dried at 100° C. for 16 hours and thereafter in a vacuum oven at 90° C. for 16 hours. Yield: 82%.

The terpolymer products of the invention find particular utility in such applications as thickeners, adhesives, in paper manufacture and coatings thereon, in ion-exchange resins and membranes, in controlled release polymers, in textile sizings, as dispersants, in oil recovery chemicals, in surface cleaning, as anti-scaling agents in boilers, and in personal care products.

While the invention has been described with particular reference to certain embodiments thereof, it will be understood that changes and modifications may be made which are within the skill of the art. Accordingly, it is intended to be bound only by the following claims, in which:

What is claimed is:

1. A precipitation polymerization process for making terpolymers of (i) a vinyl lactam, (ii) a polymerizable carboxylic acid selected from acrylic acid, methacrylic acid, itaconic acid and crotonic acid, and (iii) a hydrophobic monomer selected from an $\alpha$-olefin, an alkyl vinyl ether, an N-alkyl or N,N-dialkyl acrylamide, an alkyl ester of a polymerizable carboxylic acid, a vinyl ester of a carboxylic acid, an N-alkyl diallylamine or a salt thereof, a polymerizable silicon alkyl monomer and a polymerizable fluoroalkyl acrylate or methacrylate, with at least 6 carbon atoms in the alkyl group therein, in a yield of at least 80% as a fine, white powder which comprises polymerizing 40-70% by wt. of (i) 15-40% by wt. of (ii), and 5-20% by wt. of (iii), in an aliphatic hydrocarbon solvent which is a $C_3$-$C_{10}$ saturated hydrocarbon, branched or unbranched, cyclic or acylic, in the presence of a free radical polymerization initiator, at about 50°-150° C., under an inert gas, with agitation, wherein the solvent is present in an amount sufficient to keep the terpolymer precipitate in a stirrable state, with up to about 40% solids, during the polymerization.

2. A precipitation polymerization process according to claim 1 wherein (i) is 40-70%, (ii) is 15-40%, and (iii) is 5-20% by wt.

3. A precipitation polymerization process according to claim 1 wherein said solvent is a $C_5$-$C_8$ compound.

4. A precipitation polymerization process according to claim 1 in which said aliphatic hydrocarbon is heptane or cyclohexane.

5. A precipitation polymerization process according to claim 1 wherein said solvent is heptane.

6. A precipitation polymerization process according to claim 1 wherein said hydrophobic monomer is an alkyl ester of a polymerizable carboxylic acid.

7. A process according to claim 6 in which said hydrophobic monomer is lauryl methacrylate or stearyl methacrylate.

8. A precipitation polymerization process according to claim 1 wherein said initiator is a peroxy ester.

9. A precipitation polymerization process according to claim 1 in which polymerizable carboxylic acid is acrylic acid or methacrylic acid.

10. A precipitation polymerization process according to claim 1 which includes the steps of precipitating the terpolymer as a powder from solution, and isolating the powder.

11. A precipitation polymerization process according to claim 10 wherein the terpolymer is precipitated from the solvent as a white powder, filtered and dried.

12. A precipitation polymerization process according to claim 1 wherein said yield is 90-98%.

13. A precipitation polymerization process according to claim 1 wherein the precipitation polymerization reaction is carried out by precharging the vinyl lactam and the aliphatic hydrocarbon solvent, adding the initiator, and then feeding the polymerizable carboxylic acid and the hydrophobic monomer thereto.

14. A precipitation polymerization process according to claim 12 wherein the carboxylic acid is added over a predetermined period of time while stirring the reaction mixture.

15. A precipitation polymerization process according to claim 1 wherein the aliphatic hydrocarbon solvent is precharged into a reactor, purged with an inert gas, heated to reaction temperature, the initiator added, and then the vinyl pyrrolidone or vinyl caprolactam monomer, the polymerizable carboxylic acid and the hydrophobic monomer are introduced into the reactor over a period of time.

* * * * *